United States Patent [19]

Jager

[11] 3,829,898

[45] Aug. 13, 1974

[54] MARKING DEVICE IN A DICTATING APPARATUS

[75] Inventor: Lothar Jager, Vienna, Austria

[73] Assignee: U.S. Philips Corporation, New York, N.Y.

[22] Filed: Mar. 14, 1973

[21] Appl. No.: 340,956

[30] Foreign Application Priority Data

Mar. 23, 1972 Austria .............................. 2511/72

[52] U.S. Cl. ......... 360/137, 179/100.1 DR, 346/111
[51] Int. Cl. ............................................ G11b 27/34
[58] Field of Search ............. 179/100.2 R, 100.1 R, 100.1 DR, 346/111

[56] References Cited

UNITED STATES PATENTS

| | | | |
|---|---|---|---|
| 2,072,055 | 2/1937 | Lucarelle | 346/111 |
| 2,940,761 | 6/1960 | La Forest | 346/111 |
| 3,404,594 | 10/1968 | Dollenmayer | 179/100.2 R |

*Primary Examiner*—Stanley M. Urynowicz, Jr.
*Assistant Examiner*—Robert S. Tupper
*Attorney, Agent, or Firm*—Frank R. Trifari

[57] ABSTRACT

The invention relates to a marking device for use in a recording and/or playback apparatus, specifically a dictation machine. The device has two superposed scribers which can be moved independently of each other toward an index strip for marking. The two scribers are retained in the rest position by a single spring, and a locking device is provided for at least one of the scribers, to retain this scriber in its rest position when the other scriber is actuated.

2 Claims, 4 Drawing Figures

MARKING DEVICE IN A DICTATING APPARATUS

Figure 1:
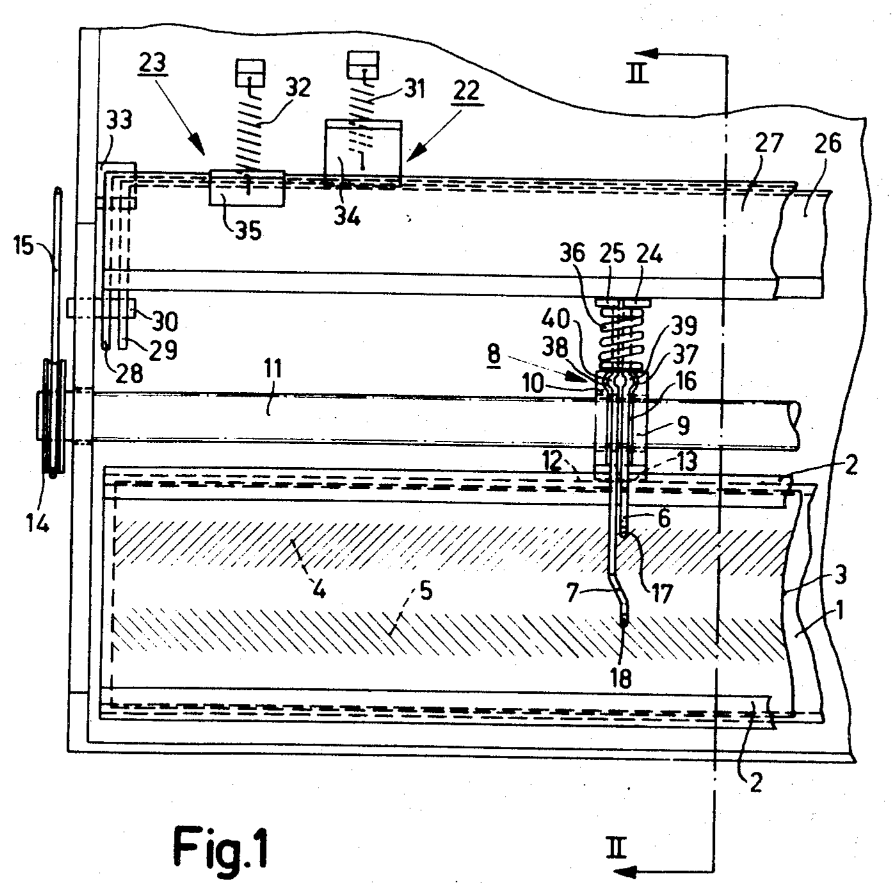

The invention relates to a recording and/or playback apparatus comprising a marking device which is movable along an index strip in synchronism with the relative movement between a record carrier and a magnetic head and which in order to make a mark in either of two longitudinal, parallel marking zones of the index strip is provided with two coplanar, adjacent scribers which can be moved out of a rest position and towards the index strip and which can be returned by spring force.

As such a marking device is a unit which in principle is movable on the outside of a recording and/or playback apparatus, its design should be as simple and as compact as possible. It is an object of the invention to provide an extremely suitable construction; to this end. The invention is characterized in that a single return spring is provided for both scribers and that for at least one scriber snapping device is provided in which this scriber snaps readily in its rest position.

It has proved to be particularly advantageous when the two scribers are superposed on each other relative to the index strip and are slidably arranged with respect to each other, extending obliquely towards the plane of the index strip whilst in the rest position of the two scribers of the free end of the scriber closer to the index strip is spaced from the strip by a smaller distance than is the free end of the other scriber, and a snapping device being provided only for the scriber which is located closer to the index strip. Such a marking device is moreover extremely suitable as an indicator for a counter whose scale graduation may be provided on the index strip, because the user of the apparatus can only see the upper scriber, which is moved along the index strip as a pointer by the marking device.

The invention will be described in more detail, by way of example, with reference to the drawing, in which two embodiments are shown, but to which it is not confined.

Figure 2:
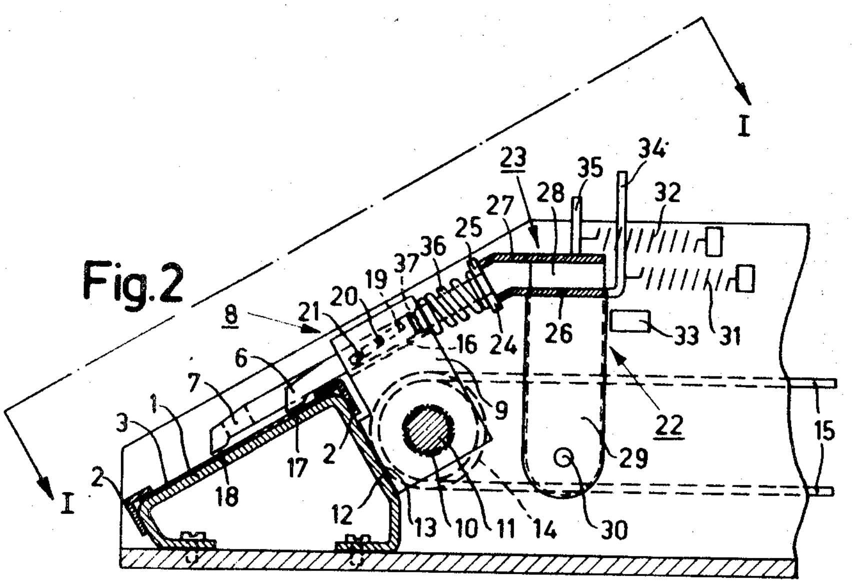
Figures 3, 4:
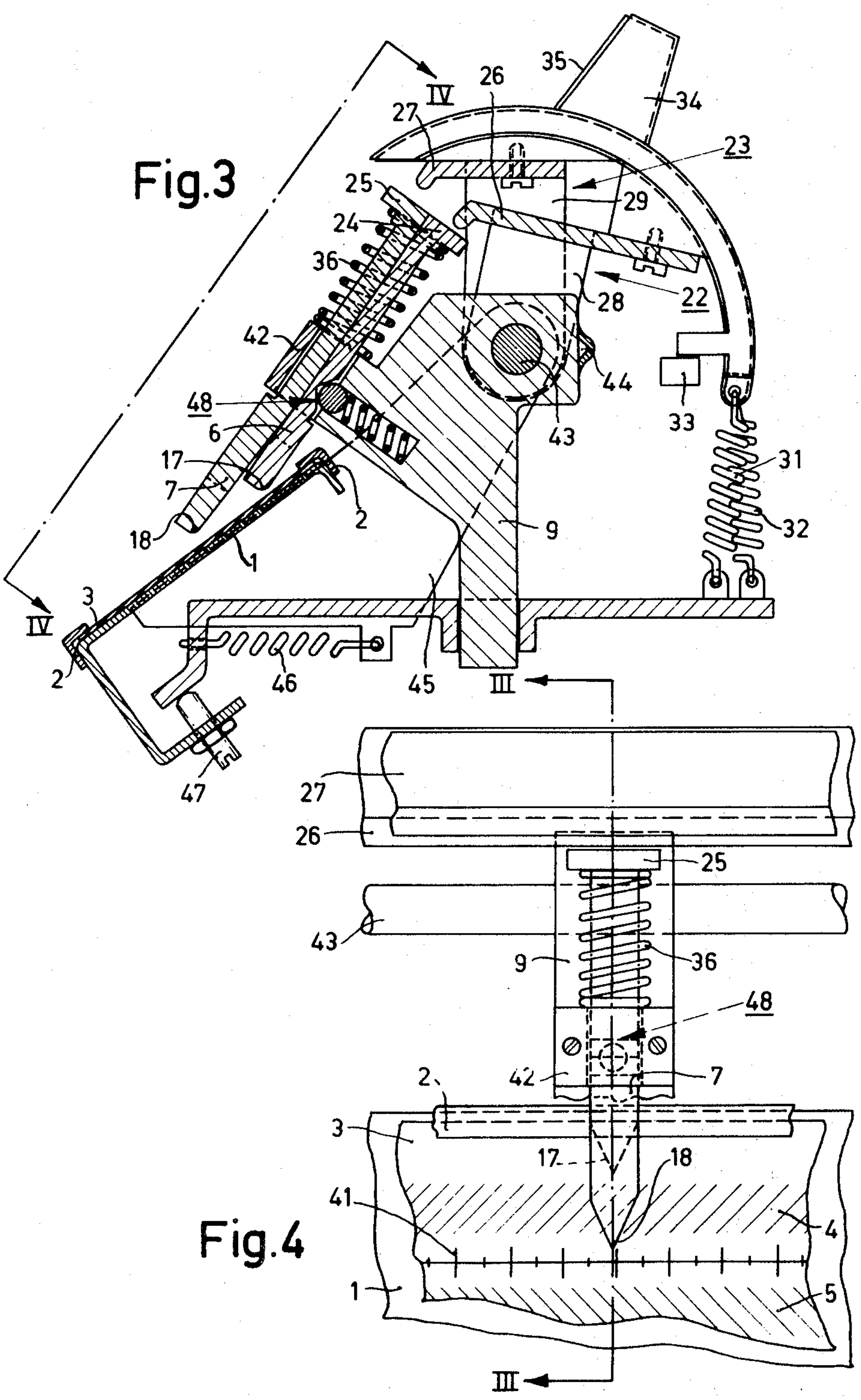

FIG. 1 shows a top plan view of a part of a marking device with scribers which are located behind each other when viewed in the direction of movement. FIG. 2 is a sectional view of a marking device taken on the line II—II in FIG. 1 FIG. 3 is a part side elevation and a part sectional view of a marking device, in which the scribers are superimposed relative to the index strip. FIG. 4 is a part top plan view of the embodiment according to FIG. 3, showing the marking scribers.

The reference numeral 1 in FIGS. 1 and 2 refers to an oblong table which on each of the two longer sides is enclosed by a rail 2 spaced from the plane of the table. In these rails an index strip 3 can be slipped, on which the longitudinal direction of the strip two adjacent marking zones 4 and 5 are provided, schematically represented by hatching in FIG. 1. In these zones, depending on the type of index strip, marks can be made in known manner by scoring, notching, burning, writing etc., for which purpose a scriber 6 and 7 respectively has been provided for each marking zone. These two scribers 6, 7 form part of a marking device 8 which can be moved along the index strip 3 in synchronism with the relative movement between a record carrier and a magnetic head, not shown.

To carry the scribers 6, 7 the marking device 8 comprises a block 9, in which a threaded hole 10 is provided, with which the block is mounted on a threaded spindle 11 which extends parallel to the longitudinal direction of the table 1. The block 9 is guided along the table by means of a surface 13 which rests against a side wall 12 of the table 1. The threaded spindle 11 is pivoted and carries a wheel 14 over which a belt 15 runs which further cooperates with a component of the apparatus which is moved simultaneously with the movement of the record carrier relative to a magnetic head, which component, for example, may be an unwinding device in an apparatus with a moving record carrier. In this way the marking device can be continuously moved along the index strip, the instantaneous position of the device corresponding to a given position of the record carrier relative to the magnetic head.

The block 9 has a slot 16 in which the two scribers 6 and 7 are mounted in a slidable fashion. The scribers themselves are flat and extend along each other. The free ends 17 and 18 are knife-shaped for the purpose of marking and are located slightly above the index strip in the rest position of the scribers. The scriber 6 is associated with the marking zone 4 and the longer scriber 7 with the marking zone 5; the free end 18 of the scriber 7 is slightly bent, so that the free ends of the two scribers are coplanar. To make a mark, the scribers can be moved so far out of the rest position towards the index strip as to ensure that the free ends 17 and 18 touch or slightly penetrate this strip. For guiding this movement each pen has a slot-shaped hole 19, through which two pins 20, 21 project which extend through the slot 16 in the block 9.

Each scriber 6, 7 has a separate control 22 and 23 respectively, arranged to engage with a bent end 24 and 25 respectively of the relevant scriber. These controls consist of U-shaped brackets, whose cross-pieces 26 and 27, in the same way as the threaded spindle, extend along the entire table 1 and whose legs 28 and 29 respectively are pivoted to the studs 30. Springs 31 and 32 respectively hold the brackets against a stop 33 in the rest position. Each bracket has a tab 34 and 35 respectively with which it can be moved out of the rest position, causing the relevant cross-piece 26 or 27 to strike against the end 24 or 25 of the relevant scriber, taking it along so far that it at least touches the index strip, so that in this position of the scriber a mark is made at the relevant point of the index strip. As can be seen, two different marks can be made in accordance with the two marking zones, for example, in the case of a dictation machine beginning-of-dictation and the end-of-dictation marks in one marking zone and correction marks in the other zone. It is obvious that the controls for making a mark may also be operated electromagnetically or may cooperate with the scribers in a different manner. The two pens 6 and 7 have a single return spring 36, which with one end rests against the block 9 and with the other end against the bent ends 24 and 25 respectively of the two scribers. Thus, this spring ensures that whichever of the two scribers is actuated, the actuated scriber is returned to the rest position when it is no longer engaged by the relevant control, i.e., when this control has returned to the rest position; of course, this also applies when the two scribers are actuated simultaneously.

This embodiment furthermore comprises a snapping device 37 and 38 for each of the two scribers 6 and 7, in which the relevant scriber snaps readily in the rest position. In the present instance the two locking devices 37, 38 each consist of a recess formed in a side wall of the slot 16, in which the protrusions 39 and 40 respectively, which have a small height, will readily engage when the relevant scriber has reached the rest position. These locking devices ensure that when one scriber is actuated, causing the spring 36 to be tensioned, the other scriber, which is then no longer subjected to the return force of the spring 36, remains in the rest position. As the weight of a scriber is not very high, the locking devices need not exert a considerable retaining force. They merely serve to prevent that when actuating a scriber the non-actuated scriber inadvertently leaves its rest position and thus causes an undesired mark, owing to vibrations of the apparatus and the like, or owing to possible frictional forces occurring between the adjacent scribers when one of them is actuated. In the present case it would also be possible to insert a partition between the scribers, in order to prevent the non-actuated scriber from being taken along when either of the scribers is actuated.

As can be seen the design of such a marking device is extremely simple and compact and yet highly reliable.

In the embodiment according to FIGS. 3 and 4 the two scribers 6 and 7 are superposed on each other relative to the index strip 3, extending obliquely towards the plane of the index strip and slidably with respect to each other. For marking, the free ends 17 and 18 have the shape of a ship's bow, the free end 17 of the scriber 6 which is located closer to the index strip 3 being spaced by a smaller distance from the index strip than the free end 18 of the other scriber 7 in the rest position of the two scribers. The scriber 7 completely covers the scriber 6 and viewed from the top, as is shown in FIG. 4, it has the shape of a pointer, so that the marking device may also be used as a pointer of a counter, for which purpose the index strip 3 is provided with a scale graduation 41. The pointer for the counter may, of course, also be mounted on the marking device as a separate member which covers the scribers.

Further, the two scribers are movably mounted on a support 9. To this end, the support is provided with a groove for carrying and guiding the scribers, which is closed with a cover 42. The support itself is arranged to slide along a rod 43 provided in the apparatus, which in this case may be effected, for example, by means of a cord and pulley, not shown, linked to an eye 44 mounted on the support. The cord-and-pulley system is then movable depending on a relative movement between a record carrier and a magnetic head.

The two scribers furthermore have bent ends 24 and 25 respectively, each provided to engage one of the two associated controls 22 and 23 respectively. These controls are again constituted by U-shaped brackets provided with tabs 34 and 35 respectively, whose crosspieces 26 and 27 respectively serve for moving the scribers and whose legs 28 and 29 respectively are pivoted to the rod 43 near its ends. The springs 31 and 32 respectively and a stop 33 serve to define the rest positions of the controls.

The table 1 carrying the index strip 3 is provided with lateral arms 45, which are also pivoted to the rod 43 near its ends. A spring 46 acting on one of the arms 45, together with a set-screw 47, defines the rest position from which the table can be moved against the action of the spring 46, as soon as a scriber acts on the index strip with sufficient force.

A return spring 36 engages with the two scribers 6 and 7, one side of the spring bearing against the support 9 and the other side against the ends 24 and 25 respectively of the scribers. In this embodiment a locking device 48 has been provided only for the scriber 6 located closer to the index strip, which device here takes the form of a spring-loaded ball accommodated in the support 9 in the bottom surface of the guide channel for the scribers and which engages a corresponding recess in the scriber 6 which is movable along the bottom surface of the guide channel.

When the scriber 7 is actuated, the locking device 48 retains the scriber 6 in its rest position. However, when the scriber 6 is actuated, the scriber 7 may also follow this movement without causing an undesired mark. This is because the free end 17 of the scriber 6 touches the index strip sonner than the free end 18 of the scriber 7 because, as already stated, the distance between the free end 17 and the index strip 3 is smaller than that between the free end 18 and the strip. Moreover the table 1 is pivoted away as soon as the scriber 6 engages the index strip, so that the distance between the free end 18 of the scriber 7 and the index strip is increased again.

Such a marking device, which comprises only one return spring and only one locking device for two scribers, is of extremely simple construction, as can be seen from the drawing.

It is obvious that a multitude of modifications of the above-mentioned embodiments are possible within the scope of the invention, in particular, as regards the arrangement and construction of the return spring and the locking device.

What is claimed is:

1. A marking device in a recording and/or playback apparatus having a magnetic head for recording and/or playback on and/or from a record carrier, comprising an indexing strip supported on said apparatus, two longitudinally extending parallel marking zones provided on said strip, two scribing means for making marks on said index strip, means mounting said scriber means above said index strip, each of said scriber means acting on a different one of said marking zones, means for moving said mounting means in synchronism with the movement between said magnetic head of said apparatus and said record carrier, means for moving each of said scribing means independently of the other between a rest position above said index strip and a marking position on said index strip, a single spring biasing both of said scriber means in the rest position, and locking means on at least one of said scriber means for retaining said scriber in the rest position and inhibiting movement thereof when the other scriber is moved to the marking position.

2. The marking device according to claim 2 wherein said scribing means are coplanar and adjacent to each other so as to be superposed one with respect to the other relative to said index strip, said scriber means being arranged for sliding movement with respect to each other and obliquely toward the plane of said index strip, and wherein the marking end of one of said scriber means is spaced from said index strip by a smaller distance than is the marking end of the other scriber means when both of said scriber means are in the rest position, said locking means being provided only on said scriber means which is located closer to said index strip.

* * * * *

PO-1050
(5/69)

UNITED STATES PATENT OFFICE
CERTIFICATE OF CORRECTION

Patent No. 3829898 Dated August 13, 1974

Inventor(s) LOTHAR JAGER

It is certified that error appears in the above-identified patent and that said Letters Patent are hereby corrected as shown below:

Claim 2, line 1, "according to claim 2" should be

--according to claim 1--

Signed and sealed this 19th day of November 1974.

(SEAL)
Attest:

McCOY M. GIBSON JR.
Attesting Officer

C. MARSHALL DANN
Commissioner of Patents